United States Patent [19]

Thompson et al.

[11] 4,432,242
[45] Feb. 21, 1984

[54] TUNABLE NOTCH FILTER FOR REDUCING VIBRATION SENSITIVITY FOR VORTEX SHEDDING FLOWMETER GENERATOR

[75] Inventors: William L. Thompson, Chardon; Michael S. Willey, Chagrin Falls, both of Ohio

[73] Assignee: The Babcock & Wilcox Company, New Orleans, La.

[21] Appl. No.: 329,539

[22] Filed: Dec. 10, 1981

[51] Int. Cl.³ .............................................. G01F 1/32
[52] U.S. Cl. ................................................ 73/861.22
[58] Field of Search ........... 73/861.22, 861.18, 861.23, 73/861.24; 324/785; 328/140

[56] References Cited

U.S. PATENT DOCUMENTS 3,709,034  1/1973  Herzl ................................ 73/861.18
3,982,434  9/1976  McMurtrie ....................... 73/861.22
4,019,384  4/1977  Herzl ................................ 73/861.24
4,270,391  6/1981  Herzl ................................ 73/861.22

Primary Examiner—Steven L. Stephan
Assistant Examiner—David R. Schuster
Attorney, Agent, or Firm—Vytas R. Matas; Robert J. Edwards

[57] ABSTRACT

A notch filter arrangement for reducing vibration noise in a vortex shedding flowmeter circuit is disclosed which utilizes a plurality of sequentially closable switches. The plurality of switches are all closed during a single period of the vibration signal fundamental frequency. Each switch is connected in series to a capacitor which is connected to the output signal of a vortex sensor so that the instantaneous average voltage of the vibration signal during any increment of time is subtracted from the vortex shedding frequency signal to produce a noise reduced signal.

5 Claims, 2 Drawing Figures

4,432,242

TUNABLE NOTCH FILTER FOR REDUCING VIBRATION SENSITIVITY FOR VORTEX SHEDDING FLOWMETER GENERATOR

FIELD AND BACKGROUND OF THE INVENTION

The present invention relates in general to vortex shedding flowmeter circuits and in particular to a new and useful arrangement for reducing vibration noise and sensitivity in vortex shedding flowmeter sensor circuits.

The operation of vortex shedding flowmeters is known and exemplified by U.S. Pat. No. 4,026,150 to Schmidt. It is known that when a non-streamlined obstacle is placed in a flow stream that vortices are produced which alternate from one side to the opposite side of the obstruction. The vortices are produced at a frequency which is directly proportional to the volumetric flow rate.

It is also known to provide a vortex shedding frequency through a preamp to circuitry, and through a two wire transmission line to a remote station for determining the flow rate. Such circuitry is exemplified by U.S. Pat. Nos. 4,134,297 and 4,094,194 to Herzl and 4,123,940 to Herzl et al.

It is known that vortex shedding transmitters are particularly sensitive to vibrations. Such vibrations are sometimes misinterpreted as the vortex shedding frequency or at least represent noise and obstruction to receiving the vortex shedding frequency.

SUMMARY OF THE INVENTION

The present invention provides for circuitry which processes a vibration signal and subtracts it from the vortex shedding frequency signal to provide a shedding frequency signal with reduced or eliminated noise.

Accordingly an object of the present invention is to provide a separate vibration sensor with preamp for sensing the vibration in the flow stream. A vibration signal is provided through a phase lock loop and counter to a channel multiplexer circuit which selectively and sequentially applies a voltage from different sequential parts of the vibration signal to a plurality of capacitors. The vortex sensor signal is provided through the multiplexer circuitry wherein the vibration signal at each instant is substracted from the vortex shedding frequency signal to provide a substantially noise reduced output signal for further amplification.

A further object of the invention is to provide a circuit for producing vibration sensitivity and vortex shedding flowmeters which is simple in design and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings, and descriptive matter in which a preferred embodiment of the invention is illustrated.

DESCRIPTION OF PREFERRED EMBODIMENT

Figure 1:
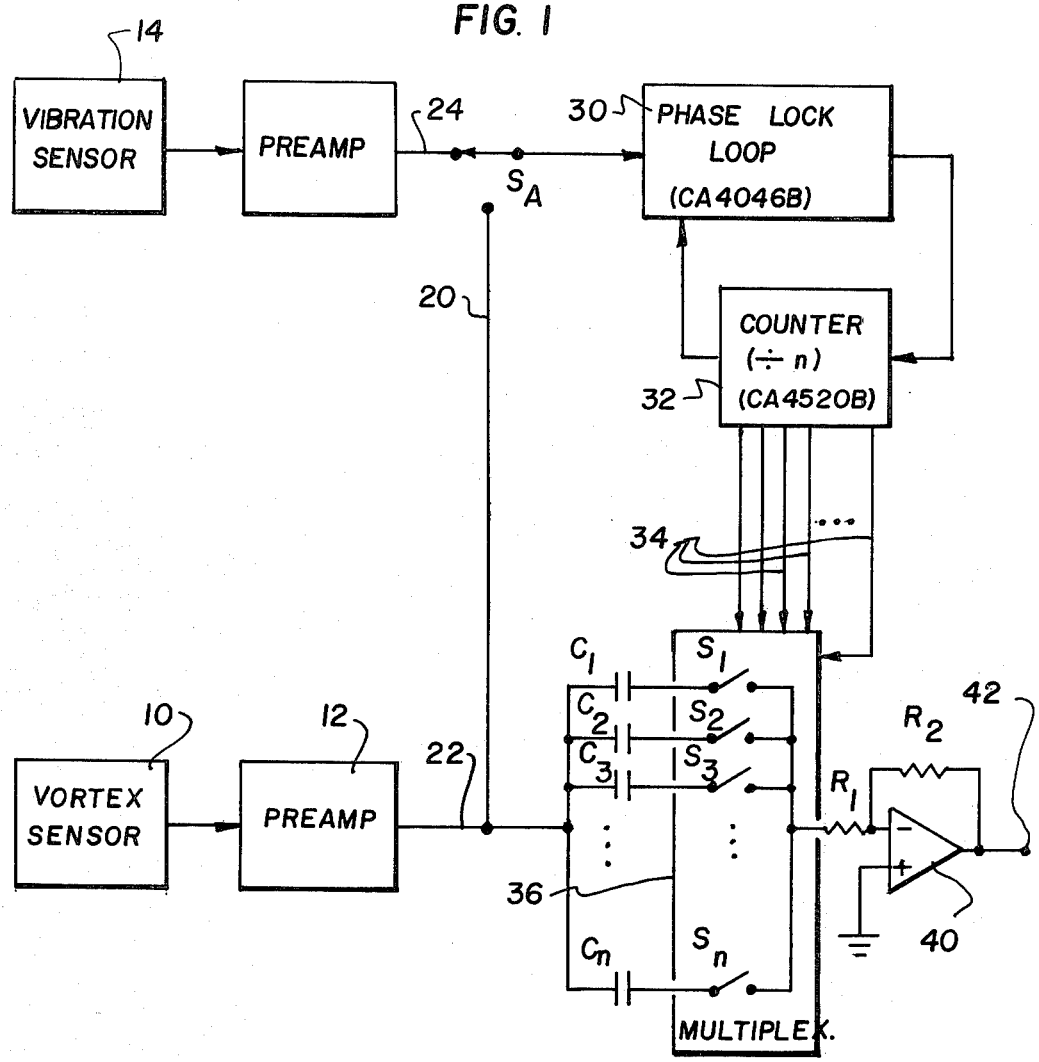
FIG. 1 is a block and schematic diagram of the circuit according to the invention.

Referring to the drawings in particular the invention embodied therein in FIG. 1 comprises a vortex sensor 10 and preamp 12 for amplifying a vortex shedding frequency from the vortex shedder. Also included is a vibration sensor 14 and a preamp for the vibration signal 16.

Elements 10, 12, 14 and 16 are known in the art.

A connecting line 20 is connected across the output lines 22 and 24 respectively of the vortex sensor and vibration sensor preamps. A selector switch $S_a$ is manually operable in a known manner to select one of the output lines 20 or 24. The output line 24 from vibration sensor 14 is shown connected. A phase lock loop 30, for example, CA4046B is connected to the output 24 of the vibration sensor which maintains a signal in known fashion in case the signal disappears. The phase lock loop circuit locks into the vibration signal and generates a control signal for tracking a notch filter that is in synchronism with the vibration signal component vibration sensor 14.

The vibration signal is multiplied by a number n (the number of switches $S_1$ through $S_n$ shown in multiplexer circuit 36. This multiplication takes place in the phase lock group 30 using known circuit components.

The output from phase lock loop 30 is connected to a dividing counter 32 which is for example CA4520B. Counter 32 divides the signal by the value n and provides it over digital output lines 34 to the multiplexer 36. The multiplexer 36 operates to sequentially close switches $S_1$ through $S_n$ during a single period of the vibration frequency. If there is no single vibration frequency the period is divided by the fundamental frequency or most prominent frequency component of the vibration signal.

Each capacitor $C_1$ through $C_n$ is thus supplied with a time average voltage value from the counter 32 signal during each time increment during which its corresponding switch is closed. Since the capacitors are in series with the vortex sensor signal coming from line 22, the capacitor voltage is subtracted from the vortex shedding frequency signal.

This leaves only the desired vortex shedding frequency signal at an output resistors $R_1$ which is amplified over amplifier 40 in known fashion to produce a vortex shedding frequency output signal at terminal 42.

The multiplexer comprising the switches is exemplified by the integrated circuit multiplexer designated CD4067B.

Figure 2:
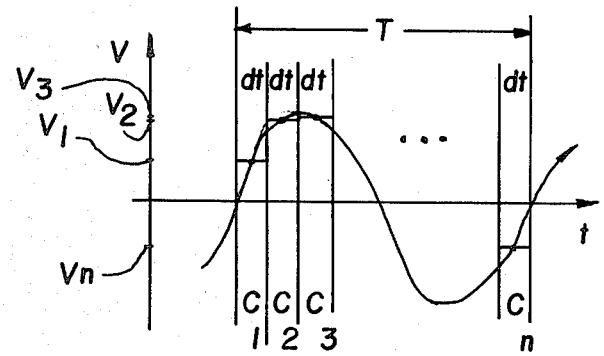
FIG. 2 is a wave form diagram showing the application of voltages to various capacitors of the circuit

Referring to FIG. 2, one period of fundamental vibration signal 44 is shown whose voltage varies over the total period T.

The total period is divided by n into time increments dt. The average voltage $V_1$ through $V_n$ for each time increment is applied to its corresponding capacitor $C_1$ through $C_n$ by the sequential operation of respective switches $S_1$ through $S_n$.

The vibration in the vortex sensor apparatus induced flow is sometimes sufficiently great to produce a vibration signal in the vortex sensor itself and, when this is the case, the switch $S_A$ can be switched over to connect line 20 and provide the vibration signal to the phase lock loop circuit 30.

The opamp stage 40 at the output of the filter converts the vortex signal currents in the capacitors to a voltage type signal to drive the following known circuitry such as a 4–20 ma converter for a control signal (not shown). The time constant of resistor $R_1$ and the capacitors taken individually determines the average of the signal and the band width of the notch. These are chosen typically so that $\frac{1}{2}\pi R_1 C$ is less than one tenth of the vibration signal to be removed. Also this determines the lower limit of the desired vortex signal to be amplified. That is the lower cutoff will be determined by $\frac{1}{2}\pi R_1 C$ where C is the value of the individual capacitors $C_1$ through $C_n$.

An important feature of this apparatus is the tracking of the notch filter to the vibration signal and the sequential elimination of a major portion of the undesired vibration effects by the votex shedding flow transmitters output.

While a single embodiment of the invention has been shown and described in detail to illustrate the application of the principles of the invention, it will be understood that the invention may be embodied otherwise without departing from such principles.

What is claimed is:

1. A filter circuit for reducing vibration sensitivity in a vortex shedding flowmeter signal generator comprising:
   means for providing a vibration signal having a fundamental frequency with a vibration signal period;
   means for providing a vortex shedding frequency;
   a phase lock loop connected for receiving the vibration signal and multiplying the vibration signal by a selected number;
   dividing means connected to an output of the phase lock loop for dividing the vibration signal by the same selected number as the multiplying in said phase lock loop;
   multiplexer means connected to the dividing means for sequentially preserving the voltage of each part of the vibration signal period as divided by the selected number in said dividing means, the vibration signal period being divided into a number of increments equal to the selected number; and
   means for subtracting each average voltage from the vortex shedding frequency during each respective time increment.

2. A filter circuit according to claim 1, wherein said dividing means comprises a counter having a digital output, said multiplexer means comprising a plurality of parallel connected switches equal in number to said selected number, said means for preserving the average voltage comprising a capacitor connected in series with each switch.

3. A filter circuit according to claim 2, wherein said means for subtracting the average voltage comprises said series connected capacitors and switches connected in series to said voltage shedding frequency for producing a noise reduced shedding frequency.

4. A filter circuit according to claim 3, including an opamp stage connected to said noise reduced shedding frequency for amplifying said noise reduced shedding frequency.

5. A filter circuit according to claim 4, including a resistor connected between said opamp and said parallel connected switches to provide a time constant $\frac{1}{2}R_C$ of the circuit being chosen so that it is less than one tenth the vibration signal having a fundamental frequency, wherein R comprises the value of the resistance connected between the opamp and the switches and C comprises the value of the individual capacitors connected in series to the switches.

* * * * *